April 21, 1970 JAMES E. WEBB 3,507,436
ADMINISTRATOR OF THE NATIONAL AERONAUTICS
AND SPACE ADMINISTRATION
TAPE GUIDANCE SYSTEM AND APPARATUS FOR THE PROVISION THEREOF
Filed May 17, 1967 4 Sheets-Sheet 1

INVENTORS:
Irving Karsh
Rueben Shatazsky
By
J. H. McCoy
J. H. Warden
ATTORNEYS

1. Total Skew $= D_R\,max. + D_P\,max.$

2. Dynamic Skew $= D_R\,max. - D_R\,min.$

3. Static Skew $= \frac{D_R\,max. + D_R\,min}{2} = D_R$

4. Average Static Skew $= \frac{D_R - D_P}{2}$

5. Skew Shift $= \frac{D_R + D_P}{2}$

INVENTORS:
Irving Karsh
Rueben Shatazsky
By
[signature]
J. H. Warden
ATTORNEYS

Fig. 2
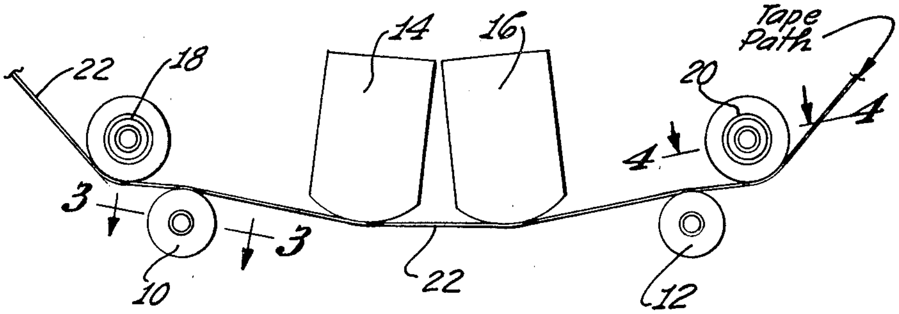
Fig. 3 Fig. 4
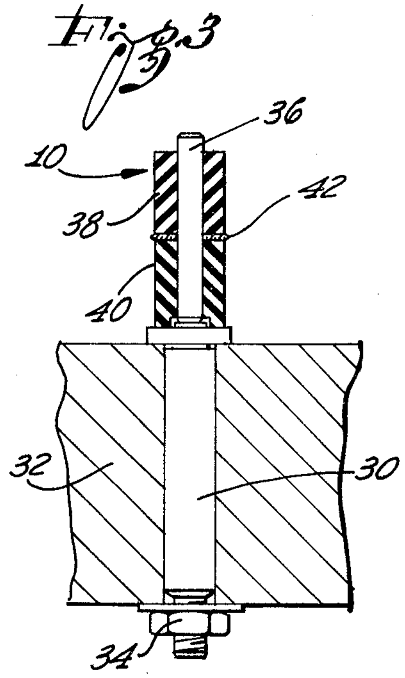
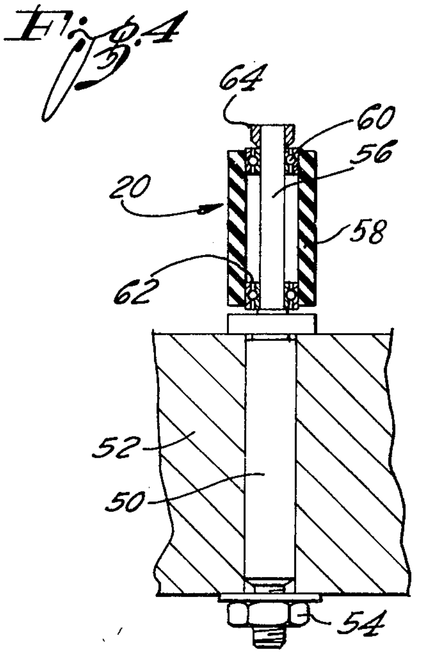
INVENTORS:
Irving Karsh
Rueben Shatazsky
By
J. H. Warden
ATTORNEYS INVENTORS:
Irving Karsh
Rueben Shatazsky
By
J. H. Warden
ATTORNEYS 3,507,436

TAPE GUIDANCE SYSTEM AND APPARATUS FOR THE PROVISION THEREOF

James E. Webb, Administrator of the National Aeronautics and Space Administration, with respect to an invention of Irving Karsh, Los Angeles, and Rubin Shatavsky, Sherman Oaks, Calif.

Filed May 17, 1967, Ser. No. 640,448
Int. Cl. B65h *17/20, 23/04;* G11b *15/60*
U.S. Cl. 226—190 3 Claims

ABSTRACT OF THE DISCLOSURE

A tape guidance system for multichannel digital recording systems having utility for minimizing the effects of dynamic skew, and apparatus for providing therefor. The guidance system of the invention includes a groove which is provided in the tape backing. The groove in the tape backing travels on stylii located adjacent the transducer in the tape transport. The guidance groove is formed in the tape backing by apparatus which includes a stylus, mounting structure for the stylus and tape transport structure which mounts the tape and moves the tape past the stylus for forming a longitudinal groove in the tape backing. Since dynamic skew is a function of the straightness of the groove formed in the tape backing the apparatus provided for forming the groove in the tape is provided with the capability of forming a precisely formed groove so that dynamic skew thereby may be reduced to a minimum.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

The invention relates to the field of magnetic tape recording, and more particularly to the multichannel magnetic tape recording of digital information. It is conventionally known that by utilizing present day equipment and materials digital information may be recorded, and reproduced, with magnetic tapes having extremely high packing density of bits. For example, bit packing densities up to 10,000 bits per inch of the tape appear to be feasible.

The high density recording of digital bits has created problems, however, in multichannel digital recording where each multibit character is recorded as parallel bits across the tape in respective channels of the tape. This type of recording is used in most digital recording systems. However, because of the presence of what is conventionally termed dynamic skew a limit has existed for maximum possible bit density.

Dynamic skew is caused by mechanical imperfections in the tape transport and in the magnetic tape. Dynamic skew manifests itself in a transverse movement of the tape as the tape is drawn across the record/reproduce transducer. The transducer has a separate head associated with each channel on the tape, and the heads combine to sense all the bits of each successive multi-bit character as the tape is drawn across the transducer. It is apparent that dynamic skew must not exceed ±½ bit if successful processing of the information is to be maintained.

Transducers are now available which make possible the recording of 100 channels per inch of width of tape, for example, A primary goal of the present invention is to provide for the transport of such a tape, for example, across the transducer in a magnetic recording/reproducing system, with a position control for the tape which is effective to limit dynamic skew to a maximum of ±25 micro-inches, for a one-quarter inch width of tape guided in a two-inch long guiding assembly.

Many systems, both electrical and mechanical, have been proposed in the past in an effort to overcome the effects of dynamic skew. However, these previously proposed systems, for the most part, have involved considerable system complications, such as extraneous buffer storage means, framing reference means, and the like.

SUMMARY

The present invention is predicated upon the realization that relative displacement of any channel of the magnetic tape with respect to the clock channel, which is usually located as the central channel of the tape, is primarily the result of non-linear tape movement occurring differentially across the tape. Therefore, by minimizing such differential tape movement by the proper guiding of the tape across the transducer dynamic skew can be minimized.

The system and apparatus of the present invention provides for tape guidance across the transducer by means of a longitudinal groove which is formed in the tape backing. The tape groove rides on a pair of stylii located at the leading and trailing ends of the transducer.

The groove may be formed on the tape backing by embossing techniques. The embossing may be achieved, for example, by means of a hot embossing stylus composed of a suitable material, such as included in the apparatus to be described infra. It is apparent that if intimate contact is maintained in the recording/reproducing system between the groove and the aforesaid stylii, and if the groove is accurately traced on the tape so as to be absolutely straight, transverse motion of the tape which is a function only of the straightness of the groove, and the resulting dynamic skew of the tape may thereby be minimized.

The novel features considered characteristic of the invention are set forth with particularity in the appended claims. The invention itself as to its construction, method of operation and fabrication process, as well as additional objects and advantages thereof, will best be understood from the following description when read in connection with the accompanying drawings.

DESCRIPTION OF DRAWINGS

FIGURE 2 represents a plan view, in somewhat schematic form, of a tape transport system utilizing a groove guidance for the tape in accordance with one embodiment of the present invention;

FIGURE 3 is a sectional view, substantially on the line 3—3 of FIGURE 2, showing the details of one of a pair of guides used in the system of FIGURE 2 so as to minimize skew of the magnetic tape;

FIGURE 4 is a sectional view, substantially on the line 4—4 of FIGURE 2, showing the details of one of a pair of rollers used in the system of FIGURE 2 in conjunction with guides such as shown in FIGURE 3;

DESCRIPTION OF THE PREFERRED EMBODIMENT

Figure 1A:
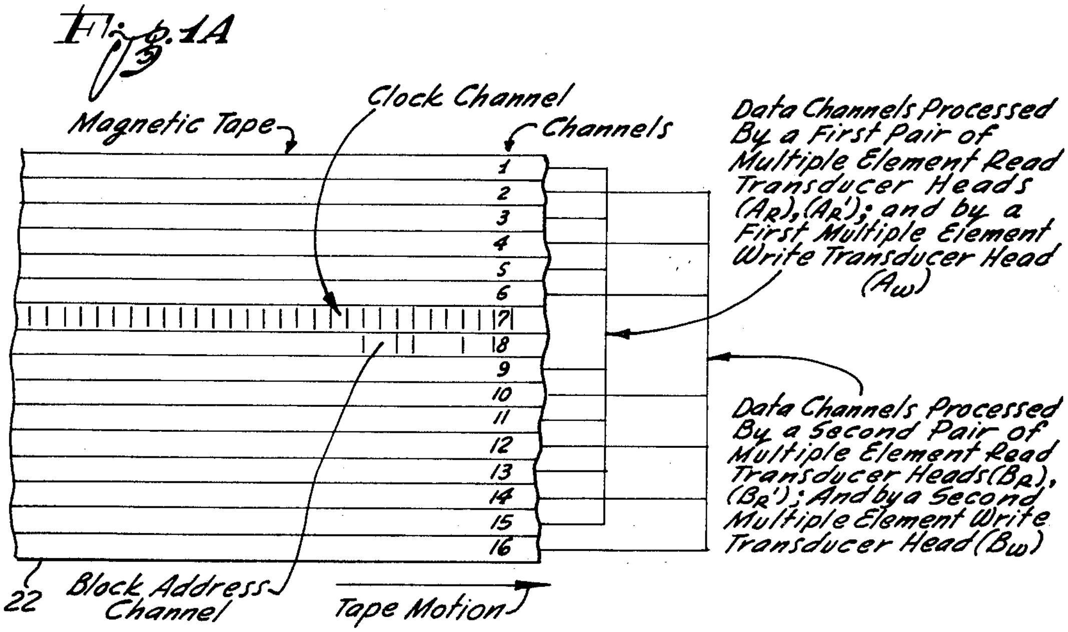
FIGURE 1A is a fragmentary, schematic diagram of a magnetic storage tape, illustrating the disposition of certain data, address and clock channels on the tape, and representative of a typical digital recording format.
Figure 1B:
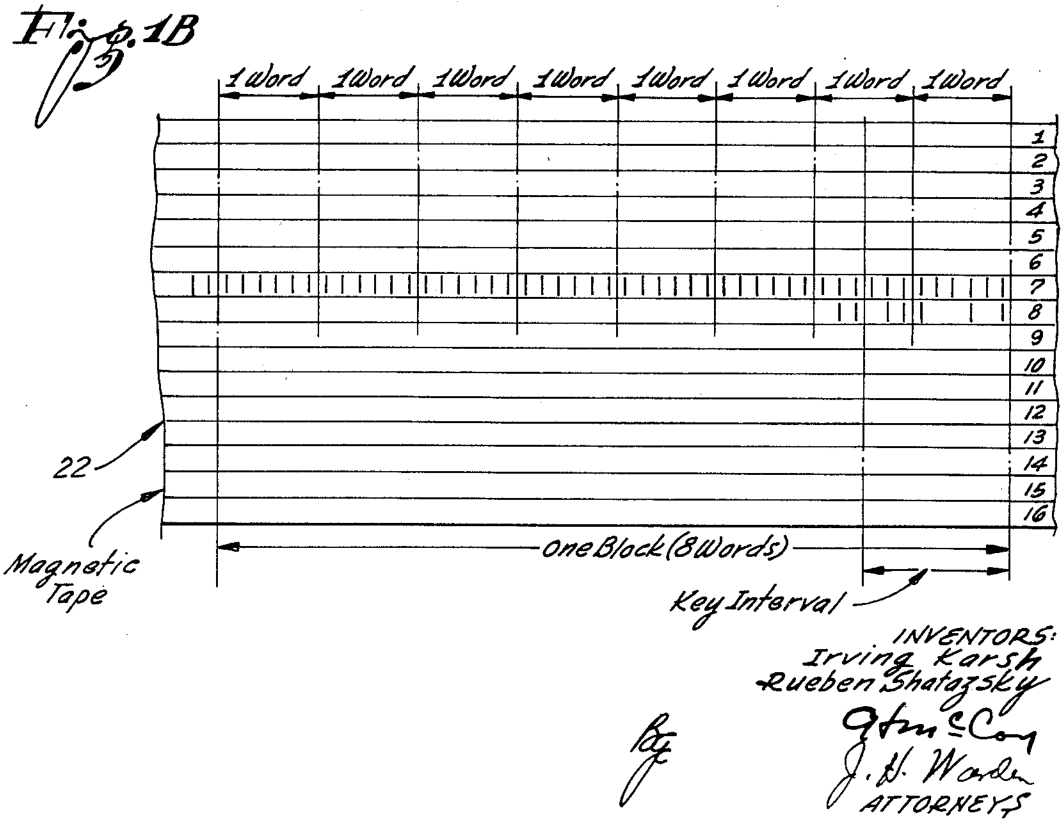
FIGURE 1B is a diagram, like FIGURE 1A, but on an enlarged scale, the latter diagram showing more particularly the disposition of the digital data on the tape, in accordance with usual techniques.

As indicated supra, digital information recorded in many digital tape systems is recorded on tape in the form of multi-bit characters, with the bits of each character disposed in adjacent channels on the tape so that each character extends transversely across the tape. The fragmentary representations of FIGURES 1A and 1B illustrate a typical example of digital recording tape for use in such systems. As previously mentioned, digital recording tape is subject to the problems relating to skew when used as shown in FIGURES 1A and 1B.

The magnetic tape as shown in FIGURES 1A and 1B may be composed of known magnetic material exhibiting a relatively high magnetic coercive force. For example, suitable magnetic material coated on a polyester designated "Mylar" by the E. I. du Pont de Nemours Company has been used successfully as magnetic storage tape. Cellulose tapes coated with magnetic oxides have also been used successfully for the same purpose.

The tape illustrated in FIGURES 1A and 1B is provided with sixteen channels which extend lengthwise of the tape. Digital data is recorded on the tape by a series of electro-magnetic write heads respectively associated with the different channels on the tape. The digital data may be read from the tape by a corresponding series of electro-magnetic read heads which likewise are associated with the different channels on the tape.

As illustrated in FIGURE 1A, for example, a first multiple electro-magnetic transducer write element, designated $A_w$, may be used to record the digital data in the channels 1, 3, 5, 9, 11, 13 and 15. A pair of multiple element electro-magnetic transducer read heads, $A_r$ and $A_r'$ are provided for reading the digital data in the channels. Likewise, a second multi-element write head, designated $B_w$, may be provided for recording data in the channels 2, 4, 6, 10, 12, 14 and 16; and a corresponding pair of multi-element read heads, $(B_r)$ $(B_r')$, may be used for reading the data in those channels.

The digital data is recorded in the tape in the form of multi-bit characters, as indicated supra. In the illustrated example of FIGURES 1A and 1B, each character is made up of seven binary bits and these bits are recorded simultaneously by the recording elements of the write head $A_w$ or the write head $B_w$ on the different channels on the tape. The resulting configuration of the data on the tape is in the form of pairs of seven bit characters, each extending transversely across the tape in the different interlaced channels.

The tape block pulses Z are recorded in the central channel No. 7 so as to minimize as much as possible the effects of the dynamic skew of the tape. The clock pulses serve to time successive pairs of the multi-bit characters. Each word on the tape in the illustrated example represents twelve characters, or six pairs, as represented by a corresponding six clock pulses in the central channel No. 7. A block on the tape is composed of eight words. The addresses for the blocks are recorded in channel No. 8, and these block addresses are read by individual read heads.

As mentioned above, the central channel No. 7 on the tape has clock pulses Z recorded in it. These clock pulses are all of the same magnetic polarity, and they are recorded at fixed equidistant positions along channel No. 7 of the tape. These clock pulses, as previously explained, correspond to the position of successive pairs of multi-bit characters recorded on the tape. Each character is made up, as mentioned, of seven binary bits, and the arrangement is such that two characters are recorded in each column extending transversely across the tape as represented by a clock pulse in channel No. 7.

An examination of FIGURES 1A and 1B will reveal that it is essential that skewing of the tape be held to a minimum in order that the various read heads may read the bits of the individual multi-bit characters without error. If the skew is greater than, for example, one-half the area required for a binary bit, bits may be lost in the reading of the corresponding characters, and errors will occur.

For a complete understanding of the invention definitions of various terms used in the specification are given. The definitions are as follows:

(a) Dynamic skew may be defined as a non-systematic displacement between two recorded bits on separate parallel channels of the tape reproduced in a given direction of tape motion. The tape motion may be either in the same direction, or in the opposite direction, with respect to the motion of the tape when the information was recorded.

(b) Static skew, on the other hand, may be defined as a systematic displacement between two recorded bits on separate channels of the tape reproduced in a given direction of tape motion. This latter tape motion, likewise, may be either in the same direction, or in the opposite direction, with respect to the motion of the tape during the recording of the digital information on the tape.

(c) Total skew, therefore, may be defined as the maximum systematic and non-systematic displacement between two recorded bits on separate channels of the tape reproduced in both forward and reverse direction of tape motion.

(d) Skew shift may be defined as the direction-sensitive component of static skew. Likewise, average static skew may be defined as the component of static skew which is constant regardless of the direction of tape motion.

Figure 1C:
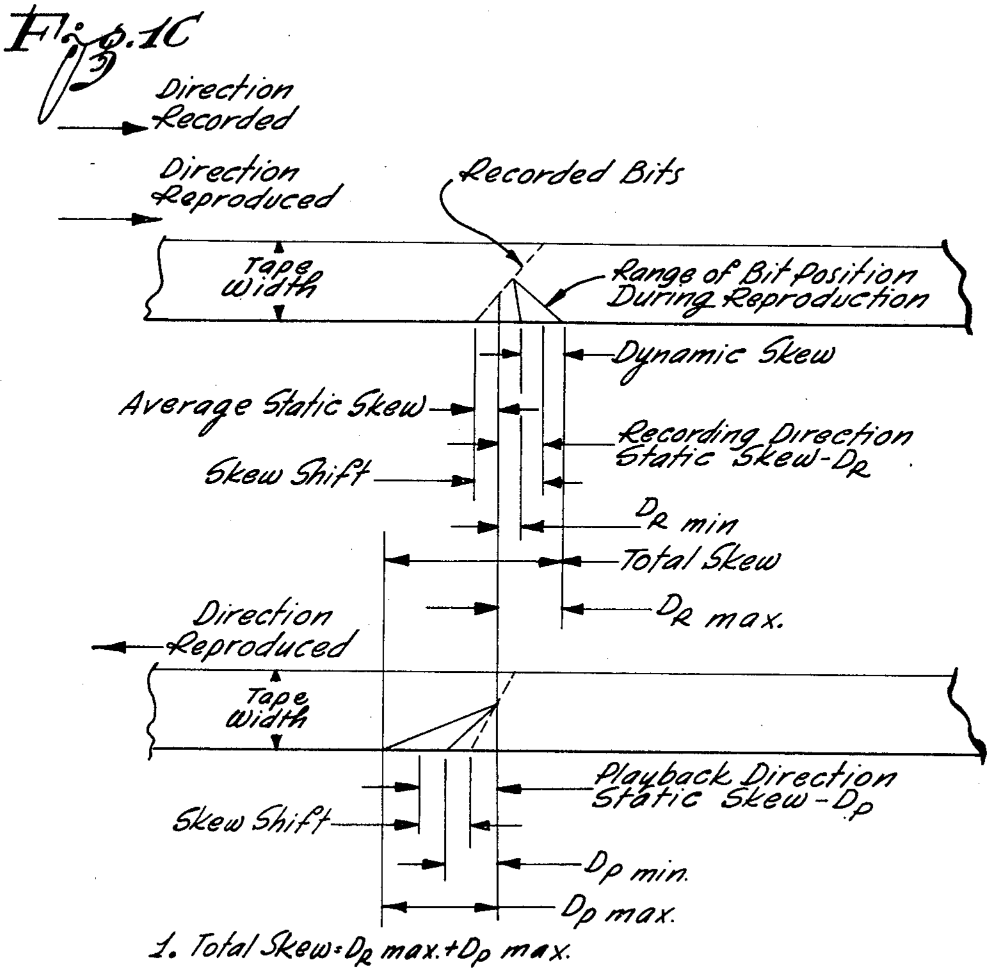
FIGURE 1C is a diagram schematically and pictorially representing skew with respect to the magnetic tape.

The terms defined above are shown pictorially in the skew diagram of FIGURE 1C.

The tape groove guidance system of the present invention, in the embodiment to be described and as shown in FIGURE 2, includes a pair of stationary guides 10 and 12 which are positioned in the tape transport at opposite ends of the record reproduce heads 14 and 16. The transport also includes a pair of guide rollers 18 and 20 which are disposed adjacent the respective guides 10 and 12, but on opposite sides of the tape 22. As illustrated in FIGURE 2, the tape 22 is drawn along the tape path across the sensitive faces of the heads 14 and 16.

The guides 10 and 12, as will be described in more detail subsequently, constitute stationary guides in the illustrated embodiment, and each incorporates a stylus or equivalent member which tracks a longitudinal groove in the backing material of the tape 22. The rollers 18 and 20 serve to guide the tape with a slight wrap angle against the guides 10 and 12 so as to maintain contact between the tape and the guides.

As shown in FIGURE 3, the guide 10, as well as guide 12, includes a bolt 30. The bolt is mounted in an appropriate supporting structure 32, and is held in the supporting structure by means of a nut 34, for example. A pin 36 extends out from the top of the bolt 30, and a pair of axially-displaced sleeves 38 and 40 are mounted on the pin 36 in coaxial relation with the pin. A disc-like guide member 42 is supported on the pin 36 between the sleeves 38 and 40. The guide member 42 may be composed of a suitable hard material, such as sapphire, and is provided with a beveled edge which protrudes slightly beyond the peripheral surface of the sleeves 38 and 40.

The sleeves 38 and 40 and the sapphire disc 42, in the illustrated embodiment, do not rotate on the pin 36, but are held stationary. Therefore, these elements are eliminated as a source of dynamic skew motion.

The rollers 18 and 20, as shown for roller 20 in FIGURE 4, for example, include an elongated bolt 50 which is held in a supporting structure 52 by means of a nut 54. A pin 56 extends out from the top of the bolt 50, and a sleeve 58 is rotatably mounted on the pin by means, for example, of ball bearings 60 and 62. A retainer 64 holds the assembly in place.

The rollers 18 and 20 may be positioned, for example, approximately two and one-quarter inches apart in a typical tape transport and, as previously mentioned, the rollers press the tape 22 against the guides 10 and 12 with a slight wrap-around angle thereby enabling the sapphire discs, such as the disc 42, to engage a central longitudinal groove in the backing of the tape 22. When so assembled, the side-to-side motion of the tape as it is drawn across the sensitive faces of the heads 14 and 16 is a function only of the straightness of the longitudinal tape groove.

In a particular assembly in which the rollers 18 and 20 are disposed two and one-quater inches apart, the guide assemblies 10 and 12 may, for example, be separated by approximately two inches. When the longitudinal tape groove is made straight, within precise tolerances, the dynamic skew of the tape 22, as it is drawn across the heads 14 and 16, is thereby reduced to zero for all practical purposes.

Although a sapphire disc guide 42 is shown in the particular illustrated example, it is clear that other equivalent guides may be used. That is, disc guides of other appropriate material may be used, and other types of guides, such as a usual recording stylus, for example, may likewise be used in conjunction with the longitudinal groove in the tape for minimizing dynamic skew.

Presently it is considered that the disc type guides, such as the sapphire guide 42 shown in FIGURE 3, have certain advantages over the usual type of stylus in that it appears that disc type guides have a higher shock loading capacity, as well as distinct guiding advantages. The guiding advantages of the disc type guides result from their disc type shape which provides an improved lead-in for centering the longitudinal tape groove, and the longer flank length around the disc which serves to smooth out any surface roughness in the guidance groove. Additionally, small deviations from the straight line of the groove are averaged out over the relatively long contact surface of the disc type guide.

In forming the groove on the tape backing material it has been found that the formation of the groove by embossing techniques which involve the displacement of material of the tape backing from one area to another, rather than actual removal of the material, is most satisfactory. For example, the groove can be formed by embossing methods using a sapphire micro-groove cutting needle with heat applied to the needle.

Figure 5:
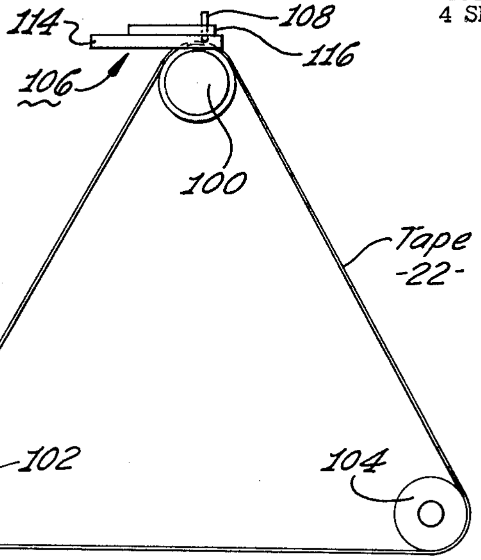
FIGURE 5 is a somewhat schematic plan view of apparatus for forming a groove in the backing of a magnetic tape for guidance purposes.
Figure 6:
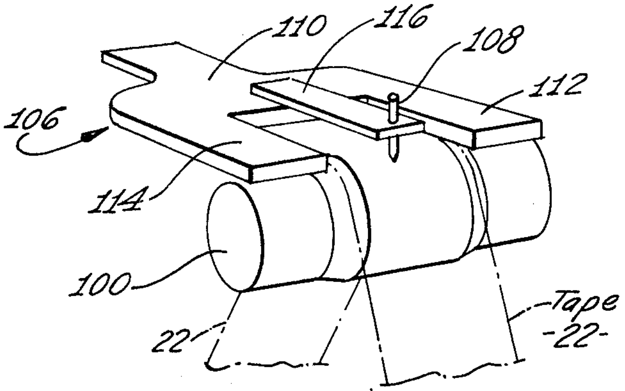
FIGURE 6 is an end perspective view of the apparatus of FIGURE 5.
Figure 7:
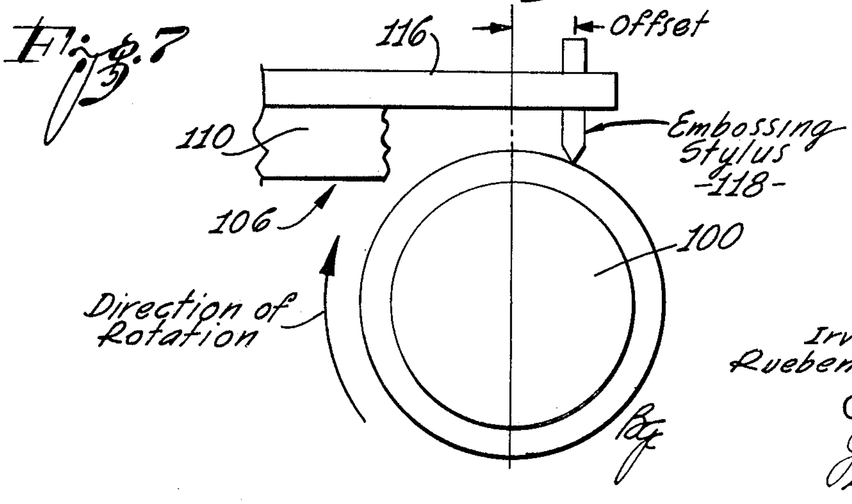
FIGURE 7 is a fragmentary side elevational view of the apparatus of FIGURES 5 and 6.

The apparatus for embossing the groove on the tape, as shown schematically in FIGURES 5, 6 and 7, includes, for example, three rollers 100, 102 and 104. The rollers 100, 102 and 104 may be of the crowned type. The tape 22 may be spliced into an endless loop face down around the three rollers 100, 102 and 104, for example, as shown in FIGURE 5, and the system may be suitably tensioned so as to provide a constant tension on the tape itself. The embossing apparatus 106 may be positioned adjacent the roller 100.

One of the crowned rollers 100, 102 or 104 may be a drive roller and the tape loop may be driven around the rollers a sufficient number of cycles so that it may become stabilized at a central position on the rollers. The tape embossing mechanism 106 is then brought into position so that the longitudinal groove may be embossed on the backing of the tape.

The crowned roller 100 at the groove-forming station, for example, has a shallow hat section profile, as best shown in FIGURE 6, with the top of the hat being between one-half and two-thirds of the width of the tape 22. The sides of the hat, for example, are made with an angle of 2°–3° and the brims are preferably made equal in diameter.

In the illustrated embodiment, the groove itself is formed, for example, by a standard phonograph sapphire stylus 108, or equivalent tool, the stylus being heated by any appropriate means, such as by an electric heating coil, not shown in the drawings. The holder 110 for the stylus 108 is in the form of a three-tined fork, including a pair of outer tines 112 and 114, and an inner tine 116. The inner, or center, tine 116 is foreshortened with respect to the outer tines 112, 114, and, as best shown in FIGURE 6, is raised above the level of the outer tines.

The stylus 108 is mounted on the center tine with its depth adjusted so that the tip of the stylus touches the top of the hat of the roller 100 when the outer tines rest on the brims of the hat, as shown in FIGURE 6. The root thickness beneath the groove is then adjusted by offsetting the stylus 108 and holder 106 in the tangential direction, as shown in FIGURE 7. The lateral location of the groove with respect to the tape may be adjusted by axial movement of the stylus in the tine 116. The stylus holder 106 should be offset in the direction of rotation of the roller 100, as shown in FIGURE 7, so that the tip of the stylus drags on the material of the tape, rather than having the stylus dig into the material.

When the magnetic tape has been grooved by the apparatus shown in FIGURES 5–7, for example, it may be used in the tape transport as shown in FIGURE 2 in the manner described above, thereby facilitating increased packing density of the digital recording to be achieved without the introduction of errors due to dynamic skew of the tape.

As indicated above, various equivalents may be used in the tape guidance system and apparatus shown in FIGURES 2–4. Also, apparatus other than that shown in FIGURES 5–7 may be used in embossing or otherwise forming the groove in the tape backing material. Thus it is understood that those familiar with the art may make modifications in the arrangements as shown and described herein without departing from the true spirit of the invention.

What is claimed is:

1. A tape guidance system for a magnetic tape having a longitudinal guide groove extended along a selected surface and adapted to be drawn along a predetermined path across the sensitive face of an electro-magnetic transducer, comprising:

(A) a pair of tape-engaging guide rollers disposed adjacent to the path of the magnetic tape at opposite sides of the transducer, being so arranged relative to the face of the transducer as to cause the tape to traverse a substantially curved path between the guide rollers as it passes across the face of the transducer;

(B) a pair of stationary guide means disposed adjacent to the opposite sides of the transducer and between the guide rollers, each of said means including an arcuate peripheral surface interposed in the path of the tape in a manner such that the tape is caused to engage the arcuate peripheral surface and traverse a curved path around each of the stationary guides; and (C) means defining an arcuate protrusion extended from the arcuate peripheral surface of each of the stationary guide means adapted to be seated within the longitudinal groove of the magnetic tape, whereby skew is substantially obviated as the tape passes across the face of the transducer.

2. The system according to claim 1 wherein the means defining the arcuate protrusion comprises a stationary sapphire disk.

3. A magnetic tape for use in a tape guidance system having a protuberant tape engaging guide comprising an elongated reelable magnetic tape member of a flexible intelligence receiving material and having a continuous longitudinal guide groove disposed in said material adapted to receive the protuberant guide to prevent skew of the tape and extended in parallelism with an edge of the tape.

References Cited

UNITED STATES PATENTS

| | | | |
|---|---|---|---|
| 2,870,265 | 1/1959 | Vermeulen -------- | 179—100.2 |
| 3,033,943 | 5/1962 | Archer et al. ------ | 179—100.2 |

BERNARD KONICK, Primary Examiner

W. F. WHITE, Assistant Examiner

U.S. Cl. X.R.

33—18; 179—100.2; 226—196; 242—76; 274—41.4, 43; 242—76; 340—174.1